US012574261B2

(12) United States Patent
Pandiyath Velayudhan et al.

(10) Patent No.: US 12,574,261 B2
(45) Date of Patent: Mar. 10, 2026

(54) TAMPER-PROOF BATCH RECORDS

(71) Applicant: Yokogawa Electric Corporation, Tokyo (JP)

(72) Inventors: Bijuraj Pandiyath Velayudhan, Singapore (SG); Ching Hua Lee, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 74 days.

(21) Appl. No.: 18/582,371

(22) Filed: Feb. 20, 2024

(65) Prior Publication Data

US 2025/0267018 A1 Aug. 21, 2025

(51) Int. Cl.
*H04L 9/00* (2022.01)
*G06F 11/34* (2006.01)

(52) U.S. Cl.
CPC .............. *H04L 9/50* (2022.05); *G06F 11/34* (2013.01)

(58) Field of Classification Search
CPC .................................. H04L 9/50; G06F 11/34
See application file for complete search history.

(56) References Cited

U.S. PATENT DOCUMENTS 11,223,655 B2    1/2022   Bhosale et al.
2019/0238316 A1  8/2019   Padmanabhan 2019/0339668 A1   11/2019  Biernat et al.
2019/0340269 A1*  11/2019  Biernat ................. H04L 9/3239
2020/0050691 A1    2/2020  Surampalli et al.
2024/0126246 A1*   4/2024  Mecocci ............ G05B 23/0272
2024/0152124 A1*   5/2024  Gamer .................. H04L 9/3239

FOREIGN PATENT DOCUMENTS

CN          112163954         4/2022

OTHER PUBLICATIONS

Androulaki et al. "Hyperledger fabric a distributed operating system for permissioned blockchains," ACM, EuroSys '18: Proceedings of the Thirteenth EuroSys Conference, Apr. 2018, Article No. 30, 15 pages.
Extended Search Report for European Patent Application No. 24210072.5, dated Apr. 3, 2025, 7 pages.

* cited by examiner

*Primary Examiner* — Boris D Grijalva Lobos
(74) *Attorney, Agent, or Firm* — Sheridan Ross P.C.

(57) ABSTRACT

A system and method for creating and managing tamper-proof batch records are provided. An illustrative method initiating a batch transaction to be completed, where the batch transaction relates to a batch recipe of a batch production. The method further includes comparing the batch transaction against one or more rules defined in a batch endorsement policy, confirming, based on the comparison, that the batch transaction meets the endorsement policy. The method also includes transmitting a batch transaction validation request. The method further includes confirming that an entry has been added to an immutable distributed digital ledger in response to the batch transaction validation request and reporting that the immutable distributed digital ledger has been updated to include the entry.

20 Claims, 10 Drawing Sheets

TAMPER-PROOF BATCH RECORDS

FIELD OF THE DISCLOSURE

The invention relates generally to batch processing and, in particular, toward securely documenting batch processing.

BACKGROUND

Batch production is a manufacturing process in which a specific quantity of a product is produced at one time, known as a batch. In batch production, the production process is designed to create a predetermined quantity of a product, typically in a single production run. This process is often used in industries where the production of a specific quantity of a product is needed, such as food and beverage, pharmaceuticals, and cosmetics.

The batch production process involves several steps, including: raw material procurement; mixing and blending; processing; packaging; and quality control. In raw material procurement, the raw materials required for the production process are acquired and inspected to ensure they meet the necessary quality standards. In mixing and blending, the raw materials are mixed or blended together according to a specific formula or recipe. In processing, the blended materials are processed using specific techniques such as heating, cooling, and/or filtering. In packaging, a finished product is packaged in containers or packaging materials, labeled, and prepared for distribution. The quality control step may be performed throughout the batch production process. Quality control measures are taken to ensure that the product meets a required quality standards.

Batch transaction recording systems exist. However, existing batch transaction recording systems are not tamper-proof and/or lack transparency. In this way, existing batch transaction recording systems leave much to be desired.

SUMMARY

These and other needs are addressed by the various embodiments and configurations of the present invention. The present disclosure can provide a number of advantages depending on the particular configuration. These and other advantages will be apparent from the disclosure of the invention(s) contained herein.

According to at least some aspects of the present disclosure, systems and methods are described which make use of digital ledger technology (e.g., blockchain, a digital distributed ledger, etc.). A distributed ledger according to the present disclosure ma include a record of consensus with a cryptographic audit trail maintained and validated by nodes. The distributed ledger can be decentralized or centralized. Blockchain technologies provide one mechanism for implementing a distributed ledger, but not all distributed ledgers necessarily employ blockchains. In addition to leveraging distributed ledger technology, embodiment of the present disclosure may also utilize text mining techniques to automatically process the batch control system transaction to create a batch record and store it on to the digital ledger, which is immutable (e.g., tamper-proof).

According to at least some aspects, a batch operator may utilize one or more control systems, such as a human-machine interface (e.g., Human Interface Station (HIS) of Field Control Station (FCS)) to start production of a new batch. An operator may load a batch recipe into the HIS to start the batch process. Each and every action from an operator and intermediate steps between a start event and a completion event may be recorded on the distributed ledger and may further be reported to all HISs in a network. Current systems collect batch information and store the collected information in one or more databases to produce a batch report; however, these database are neither tamper-proof nor completely secure.

Detecting a transaction in a batch may require a lot of data processing, which can demand a lot of computing resources. Distributing transaction processing for real-time transaction tracking and recording as disclosed herein improves efficiency by usage of computing power on distributed nodes to detect a transaction in a batch.

According to at least some embodiments, a batch agent is contemplated to be deployed on multiple computing nodes in a batch chain network (e.g., a distributed computing network). A batch agent, in some embodiments, may reside in some or all HIS nodes of a batch chain network. The batch agent may be configured to perform batch transaction detection and reporting to a batch chains ordering service.

The batch chain ordering service may be configured to receive some or all information describing transactions from various nodes in the network. The batch chain ordering service may be further configured to order the information describing the transactions in a sequential manner and broadcast the ordered information describing the transactions to each node in the batch chain network. The batch chain ordering service may further receive votes from the nodes in the batch chain network to confirm a batch transaction.

In accordance with at least some embodiments, a batch chain may be created for each discrete batch process. Once the batch end transaction is reported by one or more nodes in the batch chain network and the batch end transaction is confirmed by the ordering service, a batch record may be created and stored to a distributed ledger. Recording of the batch record on the distributed ledger may then be replicated to additional or all nodes in the batch chain network such that each node's version of the distributed ledger accurately reflects a current state of the batch process.

Many advantages can be realized by implementing a batch chain network as depicted and described herein. For instance, the proposed systems and methods provide increased transparency. Specifically, and without limitation, a batch chain can provide a secure, tamper-proof ledger of all transactions related to a batch, including the production process, materials used, and quality control measures. This increased transparency can help manufacturers and supply chain partners to quickly identify any issues or defects in the batch, and to trace the batch back to its origin.

Another advantage offered by implementing a batch chain network as depicted and described herein is improved traceability. With the batch chain technology disclosed herein, every step of the production process can be recorded and tracked, making it easier to trace a batch back to its source. This can be particularly useful in industries such as food and beverage, where traceability is critical for ensuring food safety and compliance with regulations.

A batch chain network may also provide improved quality control measures. For instance, a batch chain network can enable manufacturers to track every aspect of a batch, from the raw materials used to the production process and quality control measures. This can help to identify any issues or defects in the batch, allowing manufacturers to take corrective action quickly and prevent further issues.

The aforementioned advantages help improve trust and security in the batch process. As mentioned above, batch chain technology as described herein can help provide a secure, tamper-proof ledger to increase trust and security throughout the supply chain. By providing an auditable record of every transaction related to a batch, the batch chain network can help to prevent fraud, counterfeiting, and other forms of supply chain risk.

Moreover, because a batch chain network may be distributed by its nature, the distributed processing of each transaction and verification of such transaction across the nodes can be performed in near-real-time. Improving the speed of batch reporting helps to remove delays in the ultimate creation of a batch record.

According to at least some embodiments, the time of event reporting from two or more nodes in the batch chain network may not differ by more than N mil seconds. N may correspond to any numerical value (integer or decimal) that is configured through a user interface for a batch recipe or learned from the historical events. An event may be reported from some or all members of a batch chain network.

Additionally, event may belong to tags in the batch recipe. Corelated tags can be mined from a control engineering database or can be configured through an engineering user interface. In some embodiments, events may follow in an expected sequence for the batch recipe. According to some aspects, the sequence of events pattern can be learned from the engineering data or learned from the historical events or configured through a user interface.

In one embodiment, a method is disclosed, including: initiating, at a batch agent of a computing node in batch chain network, a batch transaction to be completed, where the batch transaction relates to a batch recipe of a batch production; comparing the batch transaction against one or more rules defined in a batch endorsement policy; confirming, based on the comparison, that the batch transaction meets the endorsement policy; in response to confirming the batch transaction meets the endorsement policy, transmitting a batch transaction validation request to one or more additional computing nodes in the batch chain network, where the batch transaction validation request comprises information describing the batch transaction along with a request for the one or more additional computing nodes to validate and add the information describing the batch transaction to an immutable distributed digital ledger; confirming that an entry has been added to the immutable distributed digital ledger in response to the batch transaction validation request; and reporting, to the batch chain network, that the immutable distributed digital ledger has been updated (e.g., modified with an add or append operation) to include the entry.

In one embodiment, a system is disclosed, including: a processor; and a memory capable of storing data thereon that, when processed by the processor, cause the processor to: initiate a batch transaction, where the batch transaction relates to a batch recipe of a batch production; request endorsement of the batch transaction against a batch endorsement policy; confirm, based on a response to the requested endorsement, that the batch transaction meets the endorsement policy; in response to confirming the batch transaction meets the endorsement policy, transmit a batch transaction validation request to one or more computing nodes in a batch chain network, where the batch transaction validation request comprises information describing the batch transaction along with a request for the one or more computing nodes to validate and add the information describing the batch transaction to an immutable distributed digital ledger; confirm that an entry has been added to the immutable distributed digital ledger in response to the batch transaction validation request; and report that the immutable distributed digital ledger has been updated to include the entry.

In one embodiment, a node of a batch chain network is disclosed, the node including: at least a portion of a distributed digital ledger including one or more entries for a block chain having entries related to a batch production; and a batch agent that is configured to: initiate a batch transaction, where the batch transaction relates to a batch recipe of a batch production; request endorsement of the batch transaction against a batch endorsement policy; confirm, based on a response to the requested endorsement, that the batch transaction meets the endorsement policy; in response to confirming the batch transaction meets the endorsement policy, transmit a batch transaction validation request to one or more computing nodes in the batch chain network, where the batch transaction validation request comprises information describing the batch transaction along with a request for the one or more computing nodes to validate and add the information describing the batch transaction to the distributed digital ledger; confirm that an entry has been added to the distributed digital ledger in response to the batch transaction validation request; and report that the distributed digital ledger has been updated to include the entry.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The example systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth to provide a thorough understanding of the present disclosure. It should be appreciated, however, that the present disclosure may be practiced in a variety of ways beyond the specific details set forth herein.

Figure 1:
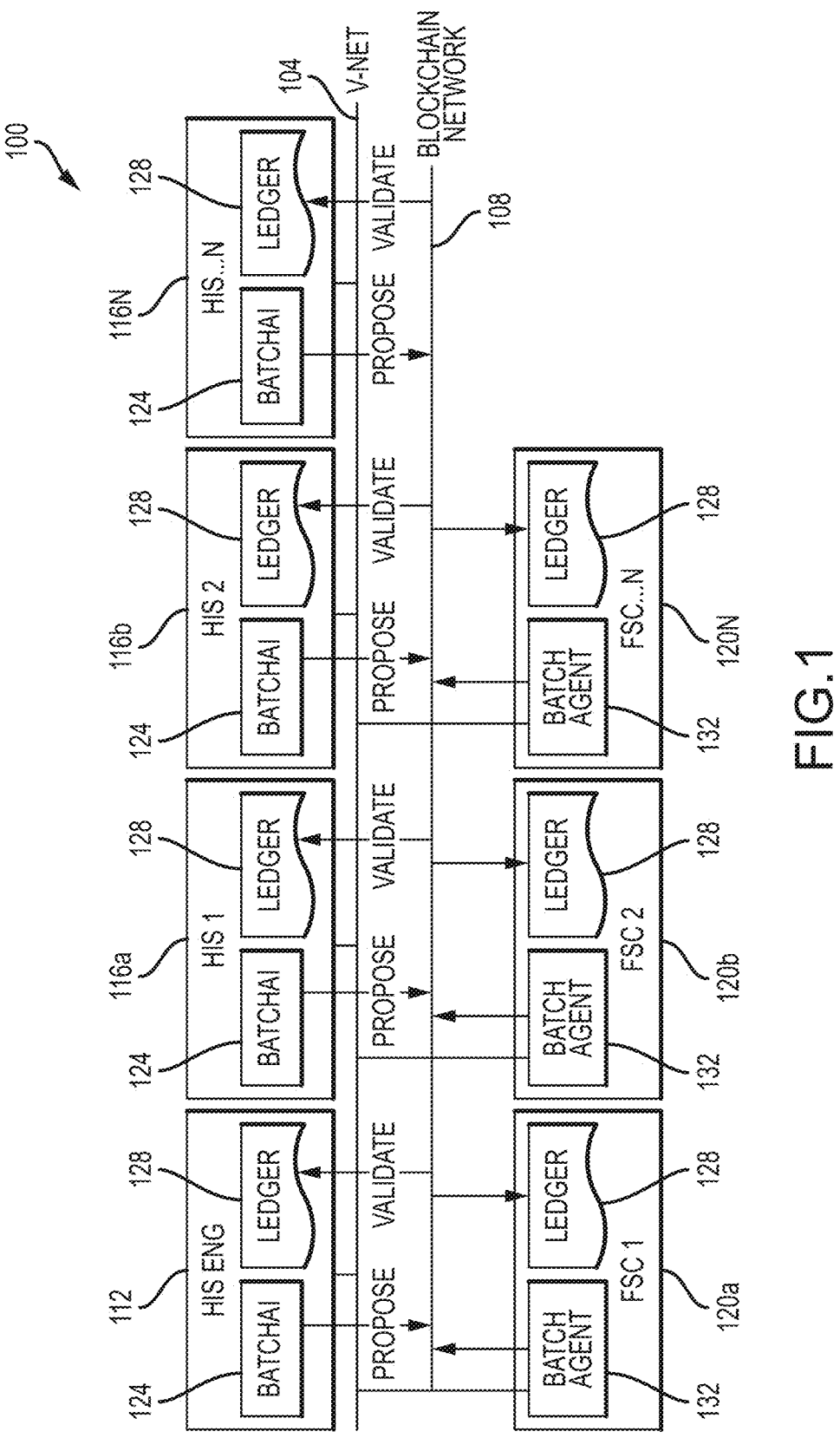
FIG. 1 depicts a batch chain network in accordance with embodiments of the present disclosure.

FIG. 1 depicts a batch chain network 100 in accordance with embodiments of the present disclosure. The batch chain network 100 is illustrated ton include a plurality of nodes 112, 116a-N, 120a-N in communication with one another via a voting network 104 and/or a blockchain network 108. The voting network 104 and/or blockchain network 108 may correspond to different logical paths established over a common communication network. Illustratively and without limitation, the networks 104, 108 may be established over a wired or wireless communication network that utilizes one or more packet-based communication protocols to exchange information between member nodes 112, 116a-N, 120a-N of the batch chain network 100. The voting network 104 may correspond to a first communication pathway used by the nodes 112, 116a-N, 120a-N to exchange votes for a proposed transaction. Thus, the voting network 104 may utilize a first type of communication protocol (e.g., a polling protocol) to facilitate the request for votes and to facilitate the collection of votes from the various nodes 112, 116a-N, 120a-N.

The blockchain network 108 may correspond to a second communication pathway used by the nodes 112, 116a-N, 120a-N to exchange information for building and maintaining the distributed ledger 128. Because the information exchanged as part of maintaining the distributed ledger 128 is different from the information exchanged as part of facilitating voting, the blockchain network 108 may utilize a second type of communication protocol (e.g., a data push protocol), which is different from the first type of communication protocol used by the voting network 104. In some embodiments, while the same nodes 112, 116a-N, 120a-N are connected to one another by both network 104, 108, it should be appreciated that different threads on each node may be responsible for supporting the different communication protocols of each network 104, 108.

The different nodes 112, 116a-N, 120a-N may correspond to similar types of computing and/or communication devices. However, the roles of the nodes within the context of the network 100 may vary. Specifically, but without limitation, each node 112, 116a-N, 120a-N may correspond to a Personal Computer (PC), laptop, tablet, kiosk, smartphone, portable computing device, or the like. Each device may include one or more processors and one or more memory devices. As an example, each node may include a processor such as a microprocessor, an Integrated Circuit (IC) chip, a Central Processing Unit (CPU), a Graphics Processing Unit (GPU), a Field Programmable Gate Array (FPGA), an Application Specific Integrated Circuit (ASIC), combinations thereof, or the like. Examples of general-purpose microprocessors may comprise, a CPU with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of an FPGA, read-only memory (ROM), programmable read-only memory (PROM), erasable programmable read-only memory (EPROM), random access memory (RAM), bus-accessible storage, network-accessible storage, etc.

The processor of each node may be coupled with one or more memory devices, which may include computer memory that stores data and/or instructions sets that are executable by the processor of the node. A non-limiting example of such instructions sets and/or data may include a batch agent 132 that is executable by a processor of the node and that enables the node to participate in a batch chain network as will be described herein. In addition to storing data and/or executable instructions, the memory device(s) may also be configured to store data that is part of a distributed ledger 128. In some embodiments, the distributed ledger 128 may be stored in whole or in part on memory of the different nodes. As additional entries or blocks are written to the distributed ledger 128, the data structure of the distributed ledger 128 may be updated to reflect the changes (e.g., modified with an add or append operation). As can be appreciated, the machine-executable instructions or data may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions or data.

FIG. 1 illustrates a single HIS engineering node 112 and a plurality of HIS nodes 116a-N. The number of HIS nodes may be any integer number that is greater than or equal to one. Similarly, FIG. 1 illustrates a plurality of FCS nodes 120a-N. The number of FCS nodes may be any integer number that is greater than or equal to one. It should also be appreciated that while the number of HIS nodes 116a-N is shown to be the same as the number of FCS nodes 120a-N, such a configuration is not required. Indeed, the number of HIS nodes 116a-N may be different from the number of FCS nodes 120a-N in the batch chain network 100. In other words, there may be a greater number of HIS nodes 116a-N as compared to the number of FCS nodes 120a-N, or vice versa.

Every HIS node 116a-N and FCS node 120a-N may be a member of the batch chain network 100. In some embodiments, the HIS engineering node 112 may take the responsibility of ordering node, and one or more of the HIS nodes 116a-N may take the responsibility of a committer node. One or more HIS nodes 116a-N that do not participate as a committer node may participate as an endorser node, as will be described in further detail herein.

Figure 2:
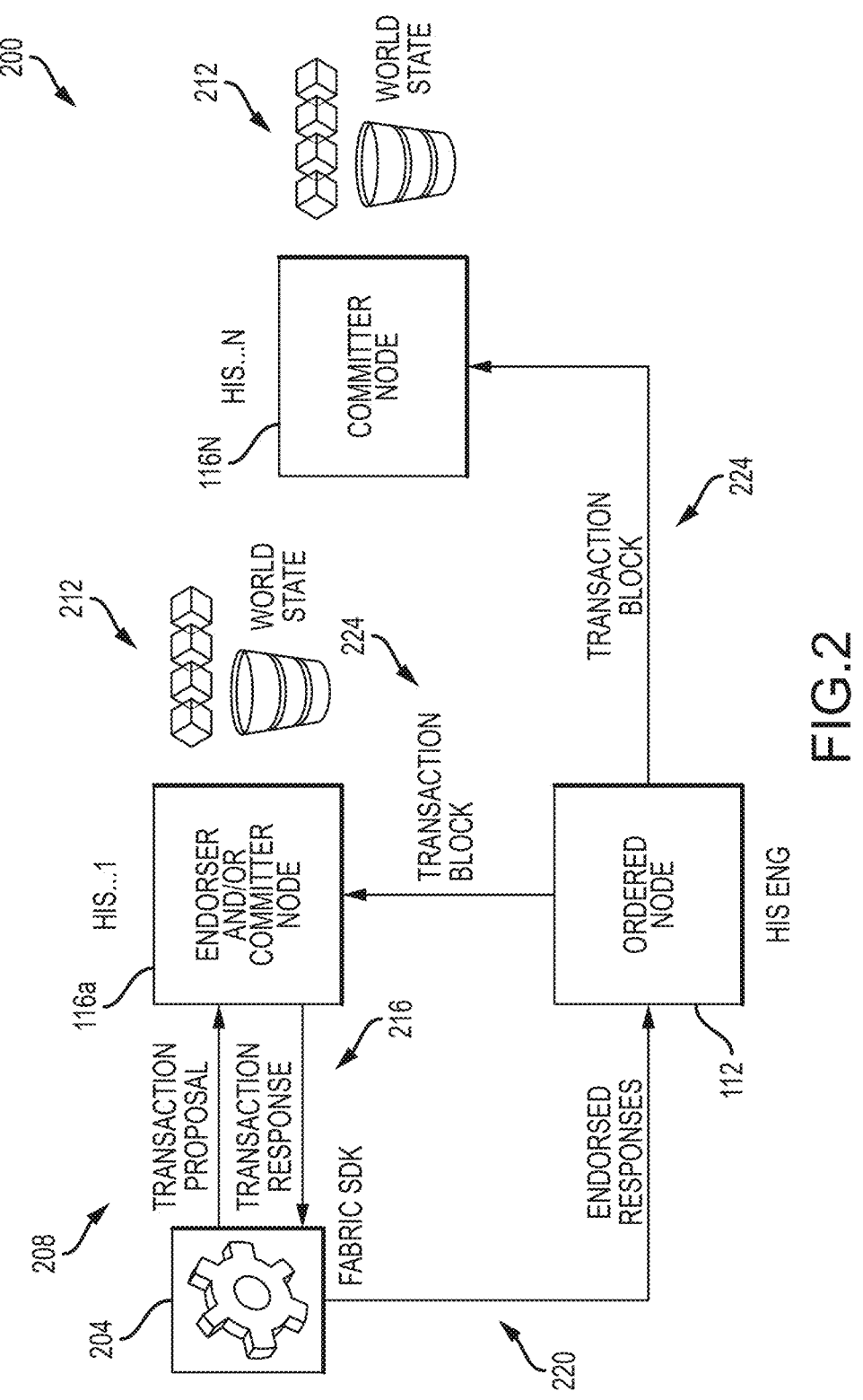
FIG. 2 depicts a batch chain transaction flow in accordance with embodiments of the present disclosure.

Referring now to FIG. 2, additional details of a batch chain transaction flow 200 will be described in accordance with at least some embodiments of the present disclosure. In accordance with at least some embodiments, a new batch transaction can be initiated from any of the HIS nodes in the network 100.

When a transaction is initiated, the initiating HIS node 204 (e.g., ordering node 204) may propose a new batch transaction 208 to the ordered node 116a. In some embodiments, the ordering node 204 may request endorsement 220 from the endorsers nodes 112, 116a-N as per the transaction response 216. If the endorsement policy is met for the transaction, then the orderer node 112 may create a new block 212 in the world state. Until the end batch transaction is reported by any of the participating nodes and endorsed by the network 100, the orderer node 112 adds up all transactions 224 to this batch record/block 212. Once the orderer node 112 detects the batch closure, the block in the world state will be transferred to the committer node 116a to commit to the distributed ledger 128. Once the block 212 is added to the distributed ledger 128, the block 212 becomes immutable and it becomes impossible to alter the record in the distributed ledger 128. The immutability of the record may be achieved cryptographically and/or by the distribution of the entry(ies) across a plurality of nodes in the network 100.

Referring now to FIGS. 3A-D, additional details of the data structure(s) 300 that may be used to constructed the digital ledger 128 will be described in accordance with at least some embodiments of the present disclosure. As mentioned herein, the digital ledger 128 may be used to store an immutable record of a product's batch production. In this sense, the digital ledger 128 may be referred to as a batch chain record on which one or more batch transactions are recorded. The batch chain may be constructed of a plurality of data structures 300. In some embodiments, a batch chain can represent the history of a product's batch production. The batch production method for a particular grade of product may be tagged to a recipe. A recipe may correspond to a set of steps to be performed to make a product.

A batch record may contain all transactions (e.g., operator actions, alarms, operator window history, etc.) in a sequential manner they occurred during the batch process. Once the batch is completed, this record can be added to the digital ledger 128 and there will be once chain per recipe of a product, even though a product may have multiple recipes.

Figure 3A:
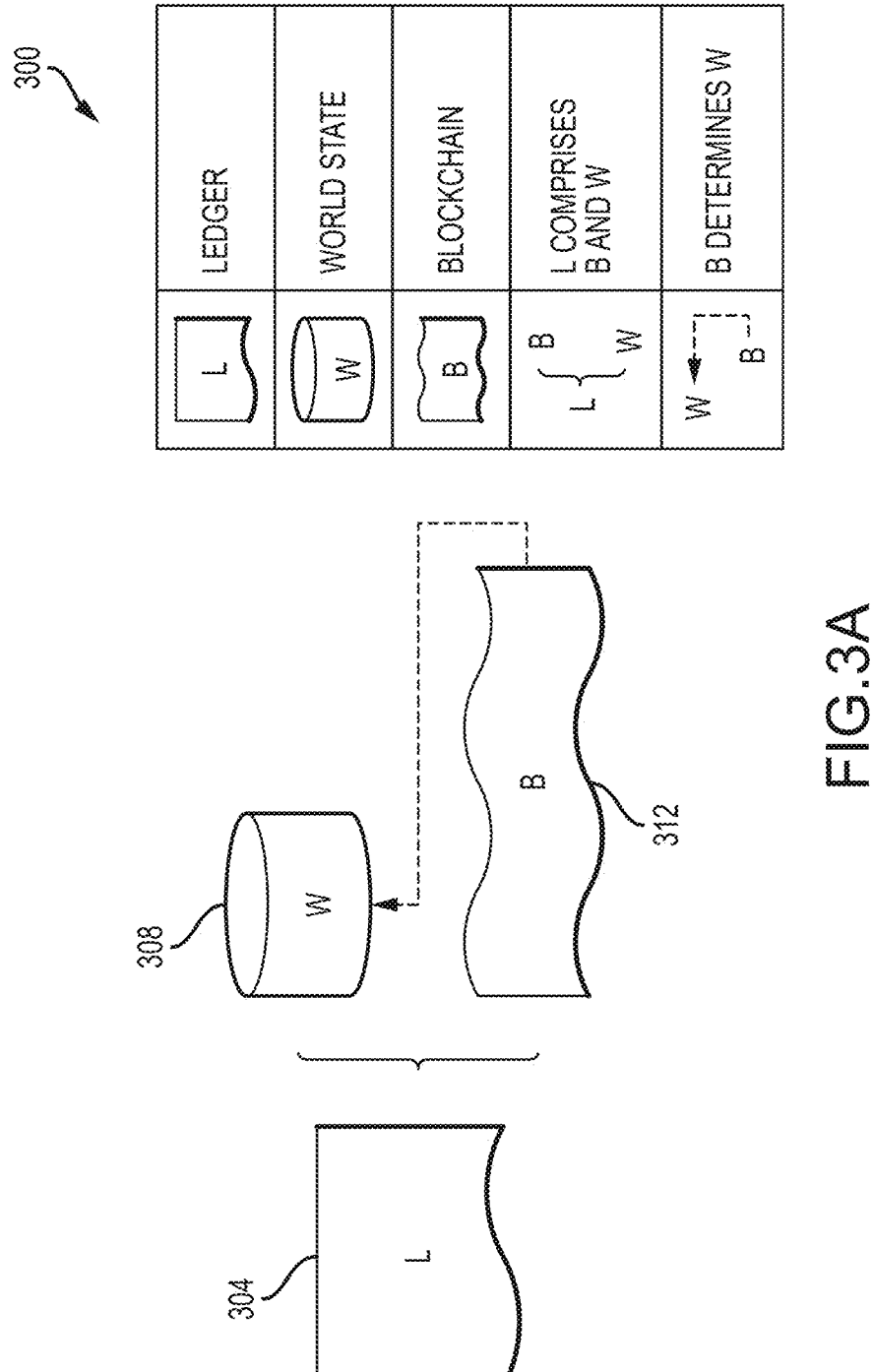
FIG. 3A depicts a first aspect of a data structure in accordance with embodiments of the present disclosure.

FIG. 3A illustrates that the data structure of the distributed ledger 128 may include an overall ledger 304 comprises a blockchain 312 and world state 308. In some embodiments, the blockchain 312 may be used to determine the world state 308.

Figure 3B:
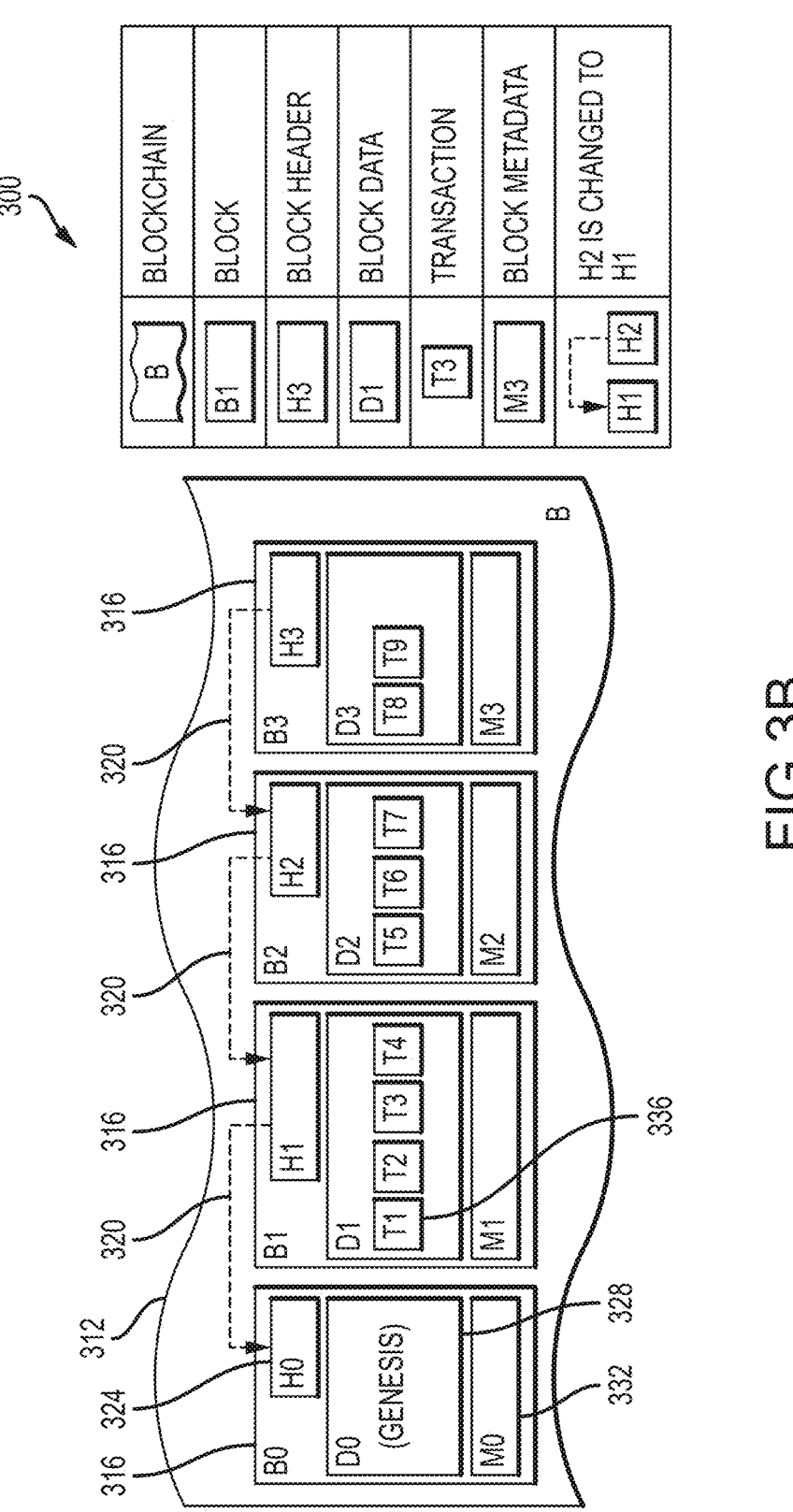
FIG. 3B depicts a second aspect of a data structure in accordance with embodiments of the present disclosure.

As shown in FIG. 3B, the blockchain 312 may include a plurality of blocks 316 that are linked together by a pointer or link 316. A first block 316 in the blockchain 312 may correspond to a genesis or first block (e.g., block B0) whereas other blocks 316 pointing to the genesis or first block may be referred to as linked blocks 316 (e.g., blocks B1, B2, B3). Each block 316 may include a header 324, block data 328, and block metadata 332. The block data 328 may be used to store transaction data 336, which may also be referred to as an entry 336. Each entry 336 may correspond to a different step or transaction performed during a batch process. The collection of entries 336 in the blockchain 312 may describe the entire process and, in some embodiments, may correspond to a description of a recipe used to produce a product. The entries 336 in the blockchain 312 may also include a description of quality assurance checks, materials used, processing steps followed, packaging steps performed, and other transactions that were included in a batch process.

Figure 3C:
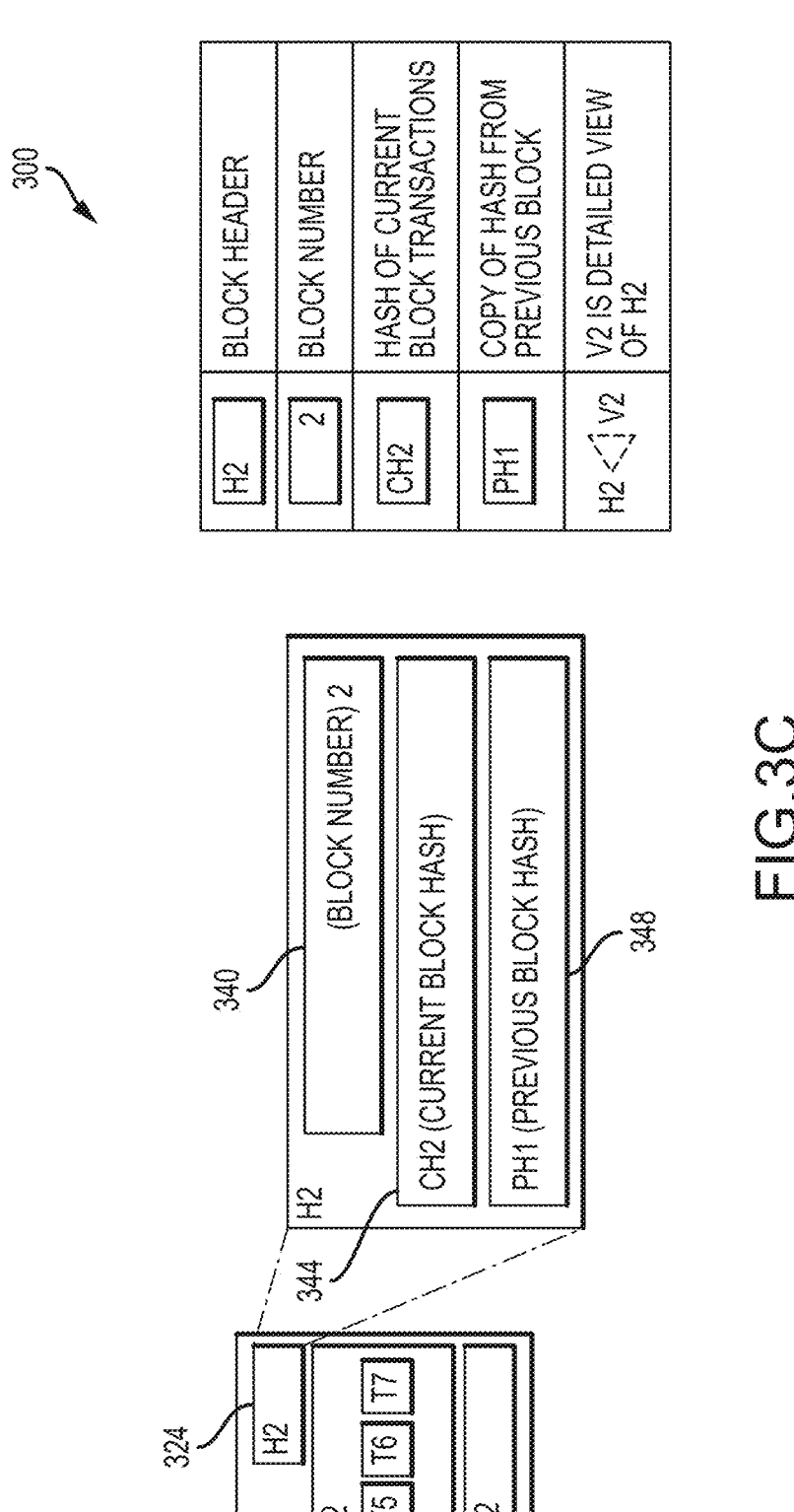
FIG. 3C depicts a third aspect of a data structure in accordance with embodiments of the present disclosure.

As shown in FIG. 3C the header 324 of each block 316 may store information that supports the creation of the links 316. Specifically, but without limitation, the header 324 may include a block identifier 340 for the block 324 in which the header 324 is provided. The header 324 may also include a current block hash 344 as well as a previous block hash 348. The current block hash 344 may correspond to a hash or plurality of hash values calculated based on the current transactions 336 stored in the block data 328 of the block 316. The previous block hash 348 may correspond to a hash value that is a copy of a hash value computed for a previous block 316. The previous block hash 348 may help create the link between a block and a previous block in the blockchain 312.

Figure 3D:
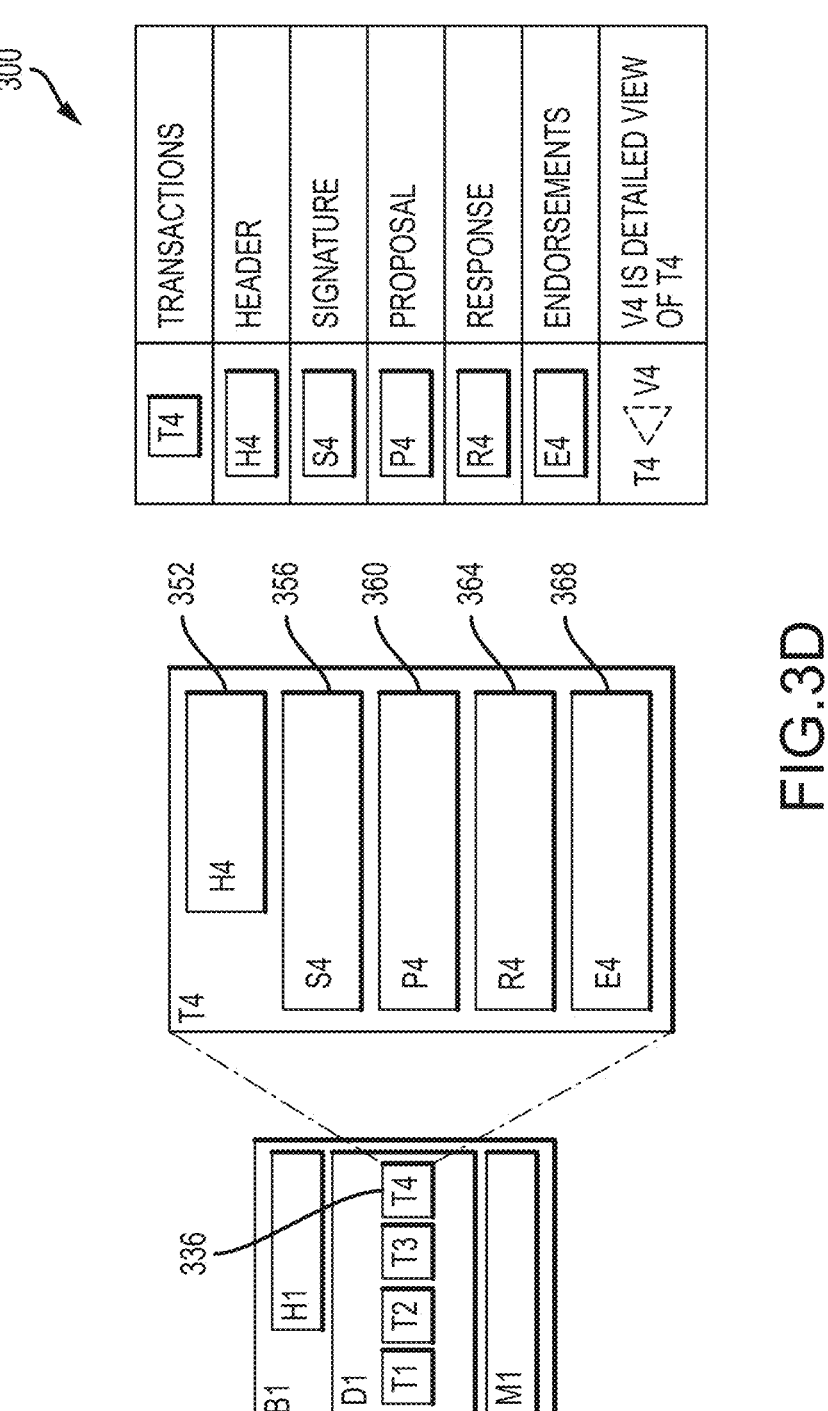
FIG. 3D depicts a fourth aspect of a data structure in accordance with embodiments of the present disclosure.

As shown in FIG. 3D, the entry 336 may correspond to an entry for one or multiple transactions performed during a batch process. The entry 336 may include a header 352, a signature 356, a proposal field 360, a response field 364, and one or more endorsement fields 368. The header 352 may include a description of the entry 336 (e.g., with an identification number, a memory location, an order during a sequence of entries, or the like). The signature 356 may include a cryptographic signature for the particular entry 336. The proposal field 360 may store information describing the transaction proposal 208. The response field 364 may store information describing the transaction response 216. The endorsements field(s) 368 may store information describing the endorsed responses 220.

Referring now to FIGS. 4-7, various methods will be described in accordance with at least some embodiments of the present disclosure. While certain steps of certain method will be described as being performed in a particular order, it should be appreciated that embodiments of the present disclosure are not so limited. Indeed, the various steps of one or more methods may be performed in different orders than those illustrated. Similarly, one or more steps from one method may be performed in another method without departing from the scope of the present disclosure.

Figure 4:
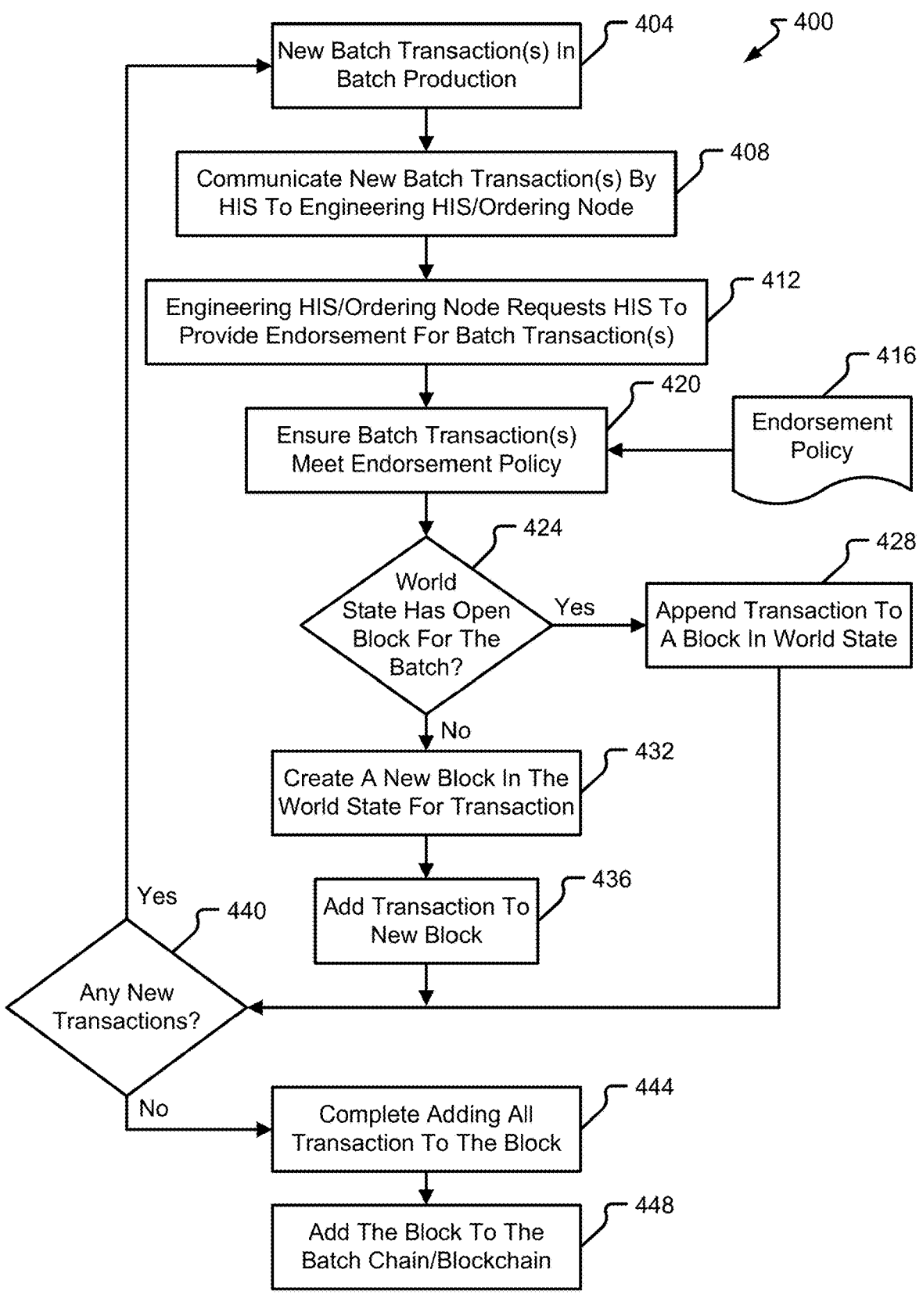
FIG. 4 is a flow chart depicting a first method in accordance with embodiments of the present disclosure.

Referring initially to FIG. 4, a first method 400 will be described in accordance with at least some embodiments of the present disclosure. The method 400 begins when a new batch transaction proposal 208 is generated for a batch production (step 404). The method 400 continues by communicating the new batch transaction(s) from one node in the network 100 to another node in the network 100 (step 408). As a non-limiting example, an ordering node 204 may communicate a new batch transaction (e.g., a description of a batch transaction or an identification of a batch recipe) to another node in the network 100, such as the HIS engineering node 112 or another HIS node 116*a*-N.

The HIS engineering node 112 or other HIS node 116*a*-N that received the information for the new batch transaction may then request one or more endorsements for the batch transaction (step 412). The method 400 then proceeds by ensuring that the batch transaction(s) meet an endorsement policy 416 (step 420). In some embodiments, this particular step may include comparing information from the batch transaction to the endorsement policy 416.

If the batch transaction meets the endorsement policy 416, then the method 400 may continue by determining whether a world state has been opened for the batch (step 424). If no world state has yet been opened for the batch, then the method 400 continues by creating a new block 212 in the world state for the transaction (step 432). After the new block in the world state has been created, then an entry describing the transaction may be added to the newly-created block (step 436).

Referring back to step 424, if the query is answered positively, then the transaction may be appended to a block in the existing world state (step 428). Following step 428 or 432, the method 400 continues by determining if any additional transactions are included in the batch process (step 440). This particular step may include determining if an end state has been entered for the batch process.

If any additional transactions remain for the batch process, then the method 400 returns to step 404. However, if no additional transactions remain for the batch process, then the method 400 proceeds by finalizing the blockchain (e.g., completing entries for the digital ledger 128). More specifically, the method 400 includes completing the addition of all transactions to the block (step 444). Thereafter, the block and it's corresponding entries are added to the blockchain 312 (step 448). As noted above, the completed blockchain may also be referred to as a batch chain. To protect data at rest (e.g., on disk), it may be desirable to add encryption using the private key of the committer node. To decrypt the records, the nodes in the network shall make use of public key issued while joining the network.

Figure 5:
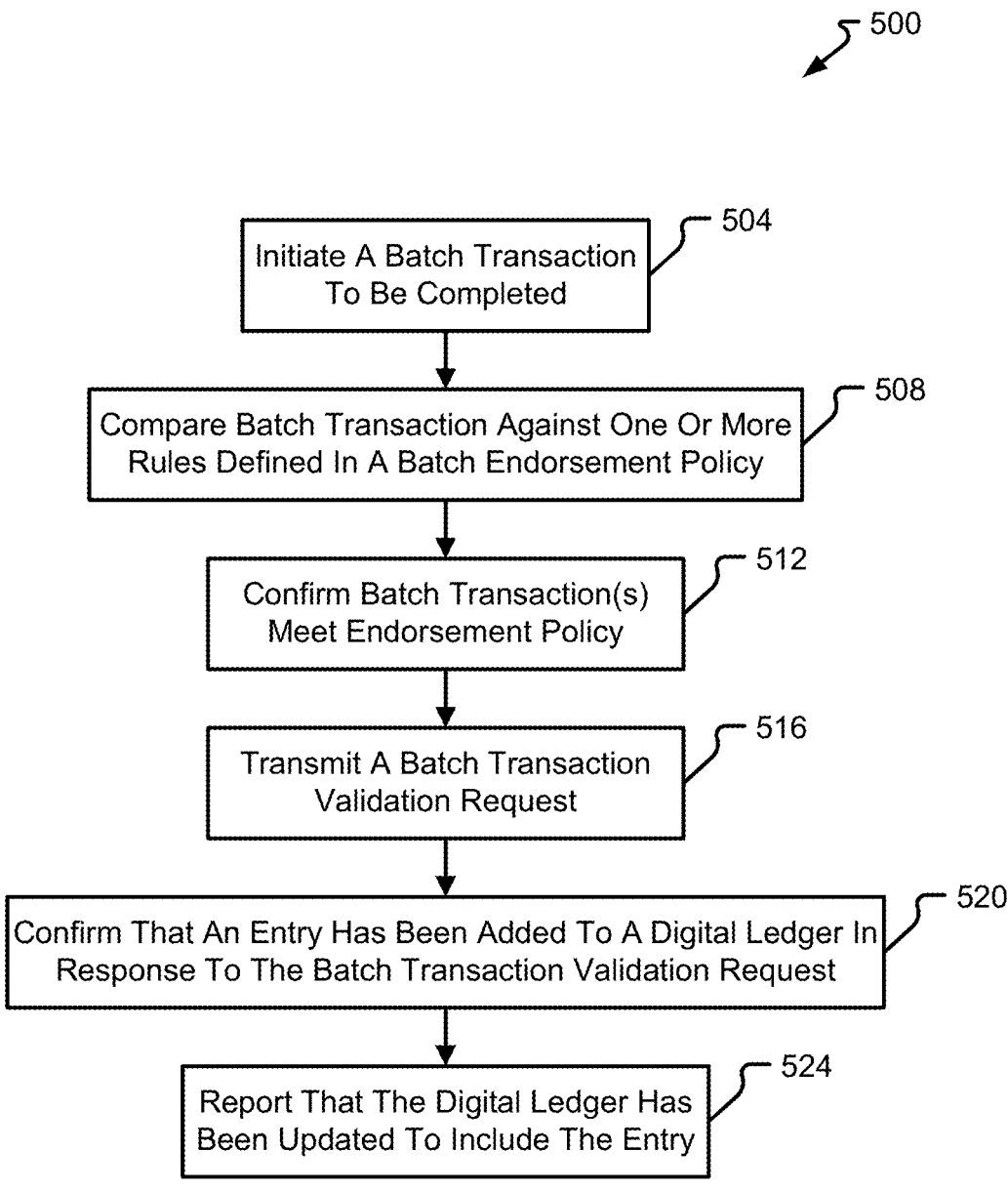
FIG. 5 is a flow chart depicting a second method in accordance with embodiments of the present disclosure.

Referring now to FIG. 5, another method 500 will be described in accordance with at least some embodiments of the present disclosure. The method 500 may be performed as part of method 400 or any other method described herein without departing from the scope of the present disclosure.

The method 500 begins by initiating a batch transaction (step 504). The batch transaction may be initiated in response to receiving a user input at an HIS node and/or FCS node. The user my select the batch transaction from a library of existing batch transactions (e.g., select a recipe for the batch process). Alternatively, for a new batch transaction, the user may indicate that a new recipe will be followed for the new batch transaction.

The method 500 continues by comparing the batch transaction against one or more rules defined in a batch endorsement policy (step 508). In some embodiments, every computing node (e.g., HIS, FCS, etc.) may have many batch transactions happening/happened, but only a subset of those transactions belongs to the batch recipe concerned. For this reason, verification/validation is useful, specifically, that subset is verified/validated based on endorsement policy. In some embodiments, the validation may be based on one or more of: 1 ("timing"), 2 ("correlations"), 3 ("sequence") and 4 ("from designated nodes").

The method 500 continues by confirming, based on the comparison, that the batch transaction meets the endorsement policy (step 512). After confirmation has been completed, the method 500 may continue by transmitting a batch transaction validation request (step 516). In some embodiments, a batch transaction validation request may be transmitted only in response to confirming that the batch transaction meets the endorsement policy. Additionally, the batch transaction validation request may be transmitted to one or more additional computing nodes in the batch chain network 100, where the batch transaction validation request includes information describing the batch transaction (e.g., a transaction ID, a recipe ID, etc.) along with a request for the one or more additional computing nodes to validate and add the information describing the batch transaction to an immutable distributed digital ledger 128.

The method 500 may further include confirming that an entry 336 has been added to the digital ledger 128 (step 520). More specifically, the method 500 may include confirming that the entry 336 has been added to a block 316 in the blockchain 312 and that the entry has been added in response to the batch transaction validation request.

The method 500 then continues by reporting that the digital ledger 128 has been updated to include the entry 336 (step 524). In some embodiments, reporting may occur when each entry 336 is added to the digital ledger 128. In some embodiments, reporting may wait until such time as the batch process is complete and all entries for the batch process have been written to the digital ledger 128.

Figure 6:
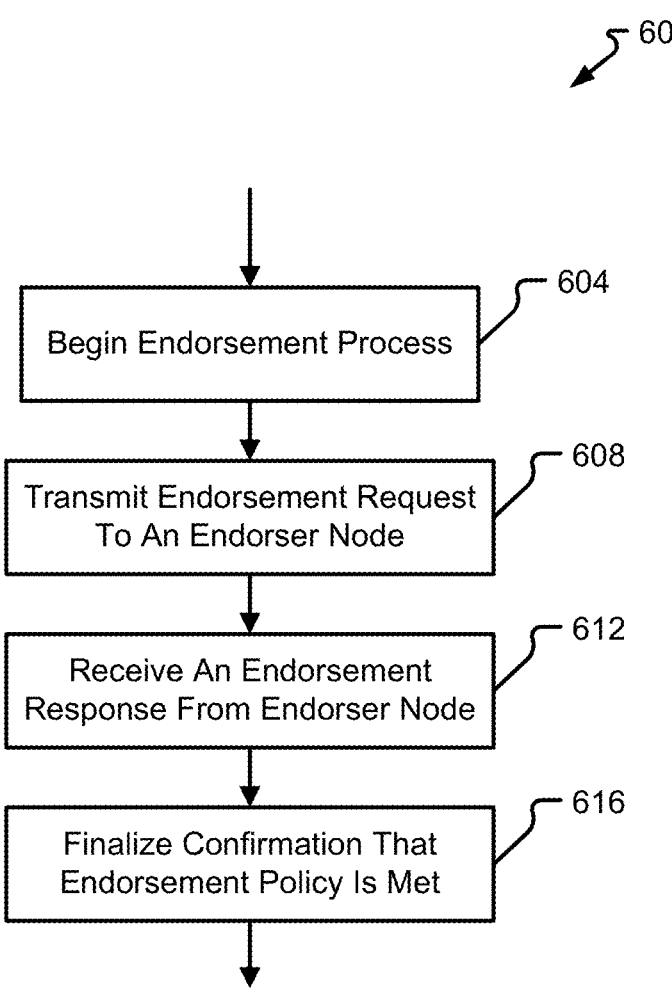
FIG. 6 is a flow chart depicting a third method in accordance with embodiments of the present disclosure.

Referring now to FIG. 6, additional details of another method 600 will be described in accordance with at least some embodiments of the present disclosure. The method 600 may be performed as part of method 400 and/or method 500 and/or any other method described herein without departing from the scope of the present disclosure.

The method 600 begins with the initiation of an endorsement process (step 604). The endorsement process may include sending one or more endorsement requests to an endorser node (step 608). In some embodiments, endorsement requests may be transmitted to one, some, or all nodes in the network 100. In some embodiments, the endorsement requests may be transmitted solely to nodes functioning as an endorser node for the batch transaction.

The method 600 continues when a response to the endorsement request is received from the endorser node (step 612). In some embodiments, ordering node/engineering node (HIS) may automatically validate/verify transactions based on endorsement policies (taking endorsement votes from the participating nodes). As an example, the endorsement policies may include the criteria of endorsement, which is based on co-relationships among processing units of each batch, as well as configurations to detect which transaction is related to which batch. Ultimately, the goal is to receive one or more endorsement responses from one or more endorser nodes indicating that the endorsement policy is met. In some embodiments, a single endorsement response indicating that the endorsement policy is met may be sufficient to continue. In other embodiments, the method 600 may require that more than one (e.g., a predetermined number greater than one) endorsement responses are received indicating that the endorsement policy is met.

When the endorsement process is satisfied in step 612, the method 600 continues by finalizing confirmation of the endorsement policy being met (step 616). As can be appreciated, the method 600 may be performed as a number of steps within step 420 and/or step 512.

Figure 7:
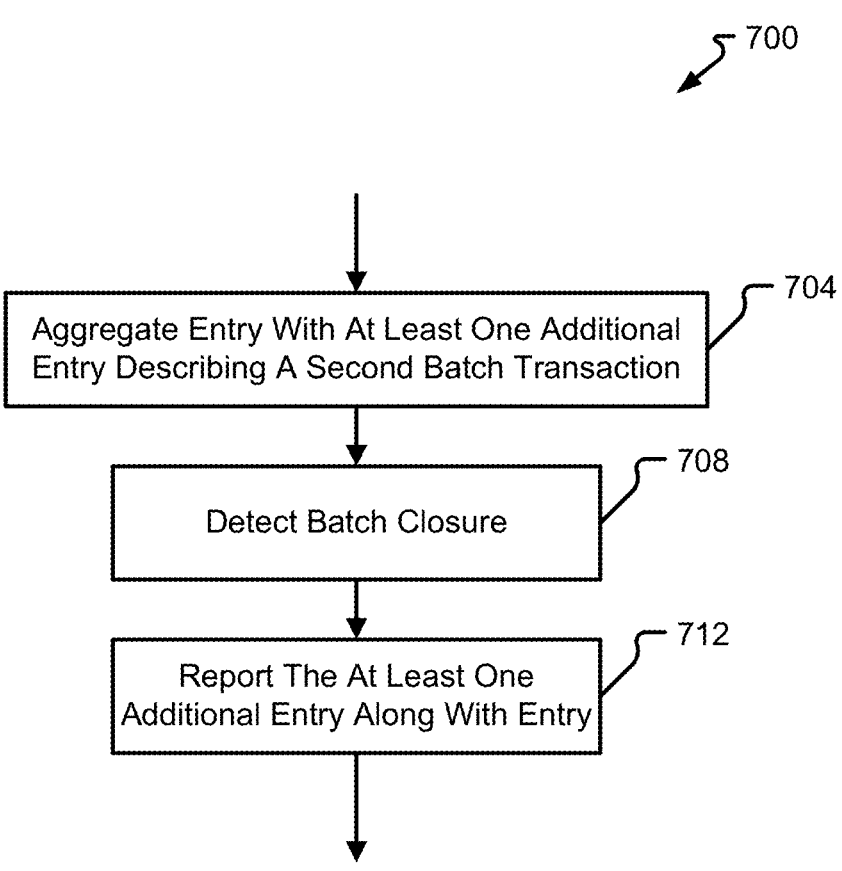
FIG. 7 is a flow chart depicting a fourth method in accordance with embodiments of the present disclosure.

Referring now to FIG. 7, additional details of another method 700 will be described in accordance with at least some embodiments of the present disclosure. The method 700 may be performed as part of method 400 and/or method 500 and/or method 600 and/or any other method described herein without departing from the scope of the present disclosure.

The method 700 begins by aggregating a block entry 336 with at least one additional entry 336 describing a different batch transaction (step 704). Specifically, but without limitation, entries from different batches may be aggregated together by tagging to help correlate different batches and/or different recipes. Aggregation of different batches by aggregation of block entries helps to more quickly detect events for one entry when an event is detected for another, related, entry.

In some embodiments, the method 700 continues by detecting a batch closure for a batch associated with the first entry (step 708). When the first entry is associated with a second entry of another batch transaction, the method 700 may further include reporting the batch closure as well as an event for the other batch transaction with which the second entry is associated (step 712). In some embodiments, the entry and the at least one additional entry are ordered in sequence according to time requested in the immutable distributed digital ledger.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

What is claimed is:

1. A method, comprising:

initiating, at a batch agent of a computing node in batch chain network, a batch transaction to be completed, wherein the batch transaction relates to a batch recipe of a batch production;

comparing the batch transaction against one or more rules defined in a batch endorsement policy;

confirming, based on the comparison, that the batch transaction meets the batch endorsement policy;

in response to confirming the batch transaction meets the batch endorsement policy, transmitting a batch transaction validation request to one or more additional computing nodes in the batch chain network, wherein the batch transaction validation request comprises information describing the batch transaction along with a request for the one or more additional computing nodes to validate and add the information describing the batch transaction to an immutable distributed digital ledger;

confirming that an entry has been added to the immutable distributed digital ledger in response to the batch transaction validation request;

reporting, to the batch chain network, that the immutable distributed digital ledger has been updated to include the entry;

aggregating the entry with at least one additional entry describing a second batch transaction;

detecting batch closure; and in response to detecting batch closure, reporting the at least one additional entry along with the entry.

2. The method of claim 1, wherein the immutable distributed digital ledger comprises a block chain and wherein the entry comprises a new block added to the block chain.

3. The method of claim 2, wherein the entry comprises a link to another block in the block chain and wherein the information describing the batch transaction comprises at least one of a block header, a block number, a hash value, and a description of a batch action, and wherein the description of the batch action comprises at least one of an operator alarm, an alarm, a window history, a product description, and a recipe.

4. The method of claim 1, wherein the computing node comprises an orderer node with a user interface and wherein the one or more additional computing nodes comprise at least one of an endorser node and a committer node.

5. The method of claim 1, wherein the batch chain network comprises a plurality of human interface stations and a plurality of field control stations connected via one or more communication networks.

6. The method of claim 1, further comprising:

transmitting an endorsement request to an endorser node; and receiving an endorsement response from the endorser node indicating that the batch endorsement policy is met.

7. The method of claim 1, wherein the entry and the at least one additional entry are ordered in sequence according to time requested in the immutable distributed digital ledger.

8. The method of claim 1, wherein the batch chain network comprises a distributed network of computing nodes.

9. The method of claim 1, wherein a time associated with the batch transaction is reported from the computing node to at least one other computing node in the batch chain network, wherein the entry comprises a tag that is correlated with tags of other entries associated with a common batch recipe, wherein the tags are configured to be mined, and wherein the entry follows in an expected sequence for the common batch recipe.

10. A system, comprising:

a processor, and a memory capable of storing data thereon that, when processed by the processor, cause the processor to:

initiate a batch transaction, wherein the batch transaction relates to a batch recipe of a batch production;

request endorsement of the batch transaction against a batch endorsement policy;

confirm, based on a response to the requested endorsement, that the batch transaction meets the batch endorsement policy;

in response to confirming the batch transaction meets the batch endorsement policy, transmit a batch transaction validation request to one or more computing nodes in a batch chain network, wherein the batch transaction validation request comprises information describing the batch transaction along with a request for the one or more computing nodes to validate and add the information describing the batch transaction to an immutable distributed digital ledger;

confirm that an entry has been added to the immutable distributed digital ledger in response to the batch transaction validation request;

report that the immutable distributed digital ledger has been updated to include the entry;

aggregate the entry with at least one additional entry describing a second batch transaction;

detect batch closure; and in response to detecting batch closure, report the at least one additional entry along with the entry.

11. The system of claim 10, wherein the immutable distributed digital ledger comprises a block chain and wherein the entry comprises a new block added to the block chain.

12. The system of claim 11, wherein the entry comprises a link to another block in the block chain and wherein the information describing the batch transaction comprises at least one of a block header, a block number, a hash value, and a description of a batch action, and wherein the description of the batch action comprises at least one of an operator alarm, an alarm, a window history, a product description, and a recipe.

13. The system of claim 10, wherein the one or more computing nodes comprise at least one of an endorser node and a committer node.

14. The system of claim 10, wherein the batch chain network comprises a plurality of human interface stations and a plurality of field control stations connected via one or more communication networks.

15. A node of a batch chain network, the node comprising:

at least a portion of a distributed digital ledger comprising one or more entries for a block chain having entries related to a batch production; and a batch agent that is configured to:

initiate a batch transaction, wherein the batch transaction relates to a batch recipe of a batch production;

request endorsement of the batch transaction against a batch endorsement policy;

confirm, based on a response to the requested endorsement, that the batch transaction meets the batch endorsement policy;

in response to confirming the batch transaction meets the batch endorsement policy, transmit a batch transaction validation request to one or more computing nodes in the batch chain network, wherein the batch transaction validation request comprises information describing the batch transaction along with a request for the one or more computing nodes to validate and add the information describing the batch transaction to the distributed digital ledger;

confirm that an entry has been added to the distributed digital ledger in response to the batch transaction validation request; and report that the distributed digital ledger has been updated to include the entry, wherein a time associated with the batch transaction is reported from the node to at least one other computing node in the one or more computing nodes in the batch chain network, wherein the entry comprises a tag that is correlated with tags of other entries associated with a common batch recipe, wherein the tags are configured to be mined, and wherein the entry follows in an expected sequence for the common batch recipe.

16. The node of claim 15, wherein the distributed digital ledger comprises a block chain and wherein the entry comprises a new block added to the block chain.

17. The node of claim 15, wherein the batch agent is further configured to validate batch transaction validation requests received from other nodes in the batch chain network.

18. The node of claim 15, further comprising a user interface to receive a request that initiates the batch transaction.

19. The node of claim 15, wherein the entry comprises a link to another block in the distributed digital ledger and wherein the distributed digital ledger is immutable.

20. The node of claim 15, wherein the batch agent is further configured to:

aggregate the entry with at least one additional entry describing a second batch transaction;

detect batch closure; and in response to detecting batch closure, report the at least one additional entry along with the entry.

* * * * *